United States Patent
Furuichi et al.

(10) Patent No.: US 10,546,145 B2
(45) Date of Patent: *Jan. 28, 2020

(54) STORING DATA FROM A SENSOR DEVICE INTO A NEIGHBORING DEVICE

(71) Applicant: INTERNATIONAL BUSINESS MACHINES CORPORATION, Armonk, NY (US)

(72) Inventors: Sanehiro Furuichi, Tokyo (JP); Masami Tada, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 177 days.

This patent is subject to a terminal disclaimer.

(21) Appl. No.: 15/435,747

(22) Filed: Feb. 17, 2017

(65) Prior Publication Data

US 2018/0239919 A1    Aug. 23, 2018

(51) Int. Cl.
    *G06F 21/62* (2013.01)
    *G06F 12/14* (2006.01)
    (Continued)

(52) U.S. Cl.
    CPC ...... *G06F 21/6218* (2013.01); *G06F 12/1408* (2013.01); *G06F 21/602* (2013.01);
    (Continued)

(58) Field of Classification Search
    CPC .. G06F 21/602; G06F 21/606; G06F 12/1408; G06F 21/6218; G06F 2212/1052;
    (Continued)

(56) References Cited

U.S. PATENT DOCUMENTS

| 7,986,917 B2 | 7/2011 | Ahlgren et al. |
| 8,799,277 B2 | 8/2014 | Park et al. |

(Continued)

FOREIGN PATENT DOCUMENTS

| JP | 2015504492 A | 2/2015 |
| JP | 2016096530 A | 5/2016 |

OTHER PUBLICATIONS

IBM, "List of IBM Patents or Patent Applications Treated as Related (Appendix P)," Apr. 6, 2018, p. 1-2.

(Continued)

*Primary Examiner* — Theodore C Parsons
(74) *Attorney, Agent, or Firm* — Robert C. Bunker (57) ABSTRACT

Embodiments of the present invention disclose a method, computer system, and a computer program product for routing an image file from an imaging device to a storage device via a near-field communication network. The present invention may include receiving a device search signal from the storage device. The present invention may include sending a search signal response to the storage device. The present invention may include receiving an encrypted password from the storage device. The present invention may include decrypting the received encrypted password. The present invention may include setting the imaging device to an exclusive external storage mode. The present invention may include generating an image file using a sensor. The present invention may include encrypting the image file using the decrypted password. The present invention may include sending the encrypted image file to the storage device for storage.

17 Claims, 5 Drawing Sheets

(51) Int. Cl.
*H04L 29/06* (2006.01)
*H04W 12/04* (2009.01)
*G06F 21/60* (2013.01)

(52) U.S. Cl.
CPC .......... *G06F 21/606* (2013.01); *H04L 63/045* (2013.01); *H04L 63/0428* (2013.01); *H04L 63/0442* (2013.01); *H04L 63/0492* (2013.01); *H04L 63/0823* (2013.01); *H04L 63/0838* (2013.01); *H04W 12/04* (2013.01); *G06F 2212/1052* (2013.01)

(58) Field of Classification Search
CPC ............ H04L 63/0428; H04L 63/0442; H04L 63/045; H04L 63/0492; H04L 63/0823; H04L 63/0838; H04W 12/04; H04W 4/008

See application file for complete search history.

(56) References Cited

U.S. PATENT DOCUMENTS

| | | | |
|---|---|---|---|
| 9,185,080 B2 | 11/2015 | Bauernfeind | |
| 9,231,662 B2 | 1/2016 | Awad et al. | |
| 10,021,567 B2 | 7/2018 | Abraham et al. | |
| 2008/0310636 A1* | 12/2008 | Bennett | G06F 12/1408 380/277 |
| 2009/0185763 A1 | 7/2009 | Park et al. | |
| 2015/0106616 A1* | 4/2015 | Nix | H04W 4/70 713/156 |
| 2015/0113627 A1* | 4/2015 | Curtis | H04L 63/06 726/10 |
| 2015/0222517 A1* | 8/2015 | McLaughlin | H04W 4/70 713/156 |
| 2015/0254463 A1* | 9/2015 | Ryhorchuk | G06F 21/602 713/156 |
| 2015/0312759 A1 | 10/2015 | Kim et al. | |
| 2016/0094558 A1* | 3/2016 | Lal | H04L 63/061 713/171 |
| 2016/0295038 A1 | 10/2016 | Rao et al. | |
| 2017/0163608 A1* | 6/2017 | Bicket | H04W 4/70 |
| 2019/0012467 A1 | 1/2019 | Richardson | |

OTHER PUBLICATIONS

Furuichi et al., "Storing Data From a Sensor Device Into a Neighboring Device," Application and Drawings, Filed on Dec. 26, 2017, 26 Pages, U.S. Appl. No. 15/854,382.

Mell et al., "The NIST Definition of Cloud Computing," National Institute of Standards and Technology, Sep. 2011, p. 1-3, Special Publication 800-145.

IBM: List of IBM Patents or Patent Applications Treated as Related (Appendix P), Aug. 21, 2019, pp. 1-2.

Furuichi et al., "Storing Data From a Sensor Device Into a Neighboring Device," Applicaiton and Drawings, Filed on Aug. 9, 2019, 29 pages, U.S. Appl. No. 15/536,949.

* cited by examiner

STORING DATA FROM A SENSOR DEVICE INTO A NEIGHBORING DEVICE

BACKGROUND

The present invention relates generally to the field of computing, and more particularly to electronic data storage.

Many people utilize cameras and other personal imaging devices to generate digital images. Some people may avoid buying a dedicated camera or lose or damage their own camera. Thus, a person may rent or borrow a dedicated camera in some situations. When a person captures an image using a rented or borrowed camera, any images captured and stored on the camera may need to be accessed and moved to allow the person who took the image to have a copy of the digital image file.

SUMMARY

Embodiments of the present invention disclose a method, computer system, and a computer program product for routing an image file from an imaging device to a storage device via a near-field communication network. The present invention may include receiving a neighboring device search signal from the storage device. The present invention may also include sending a search signal response to the storage device. The present invention may then include receiving an encrypted password from the storage device. The present invention may further include determining a onetime password based on decrypting the received encrypted password. The present invention may also include setting the imaging device to an exclusive external storage mode. The present invention may then include generating an image file using a sensor associated with the imaging device. The present invention may further include encrypting the image file using the decrypted onetime password based on the setting of the imaging device to the exclusive external storage mode. The present invention may also include sending the encrypted image file to the storage device for storage.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As described previously, many people utilize cameras and other personal imaging devices to generate digital images. Some people may avoid buying a dedicated camera or lose or damage their own camera. Thus, a person may rent or borrow a dedicated camera in some situations. When a person captures an image using a rented or borrowed camera, any images captured and stored on the camera may need to be accessed and moved to allow the person who took the image to have a copy of the digital image file.

In order to move the image file from the camera or imaging device to a storage device the person owns, the person may need to go through cumbersome operations including unloading the recording medium, selecting the relevant image data, and then copying the selected image data to the person's storage device. This process may inadvertently allow for image data to remain on the imaging device where other persons may be able to access the images. Furthermore, imaging devices may be owned by a school or other organization and shared by multiple users increasing the aforementioned problems.

Therefore, it may be advantageous to, among other things, provide a way to automatically transfer image files from an imaging device to personal storage carried by a person wirelessly, based on the proximity of the personal storage to the imaging device.

The following described exemplary embodiments provide a system, method and program product for automatic routing of image data from an imaging device to a neighboring storage device. As such, the present embodiment has the capacity to improve the technical field of electronic data storage by automatically routing a generated image file for storage from an image generating device to an external personal storage device. More specifically, an imaging device may generate an image file and detect and communicate with a personal external storage device to route the image file to the external storage device for storage instead of storing the image file locally in the imaging device.

According to at least one embodiment, when an imaging device, such as a camera, that has internal storage is used to generate an image file while in close proximity to another device that has internal storage, and when both devices are capable of wirelessly communicating with each other, then images generated by the imaging device may be sent via a network connection to the other device for storage. Thus, when a person uses an imaging device while carrying a personal mobile device, such as a smartphone, as images are generated, the images may be transmitted directly to the mobile device storage without storing the images locally within the imaging device. As such, persons may freely use imaging devices that belong to others and automatically have images transferred to their mobile devices and stored without the effort to manually transfer images and without leaving traces of personal images on the imaging device where others may gain access to them. Additionally, multiple persons may use the imaging device in succession with the generated images automatically transferring from the imaging device to the correct personal storage device of the person who took the picture, thereby efficiently routing the image files. Close proximity may be defined by a threshold distance between the imaging device and the storage device. The threshold distance may merely be set to include any devices within the operating range of the near-field communication used by both devices. Alternatively, the threshold distance may be set to a predefined distance, such as six feet. Thus, only storage devices within the predefined distance of the imaging device may be used for external storage. Additionally, if more than one suitable storage device can communicate with the imaging device, the nearest storage device may be selected. According to at least one embodiment, if more than one storage device is available, a prompt may be displayed on the imaging device to allow the user to select the storage device to use. Distances may be determined using global positioning system coordinates, communication signal strength, and so on.

If a neighboring mobile device is not found by the imaging device (or the mobile device is out of storage space or is unable to create a secure connection with the imaging device), then the imaging device may store the generated image files in local internal storage. External storage devices may be detected using near field communication (NFC) features, Bluetooth® (Bluetooth and all Bluetooth-based trademarks and logos are trademarks or registered trademarks of Bluetooth SIG, Inc. and/or its affiliates), Wi-Fi, or other communication technologies. The imaging device may include an access blocking mechanism to block access to internal storage while a connection is established to the external storage device. Presence of the blocking mechanism may be verified by a trusted third-party organization and a certificate issued that includes a public encryption key pair. Internal storage may be blocked to ensure image file data remains private by directly transferring the image file to personal external storage without a persistent local copy of the image.

Figure 1:
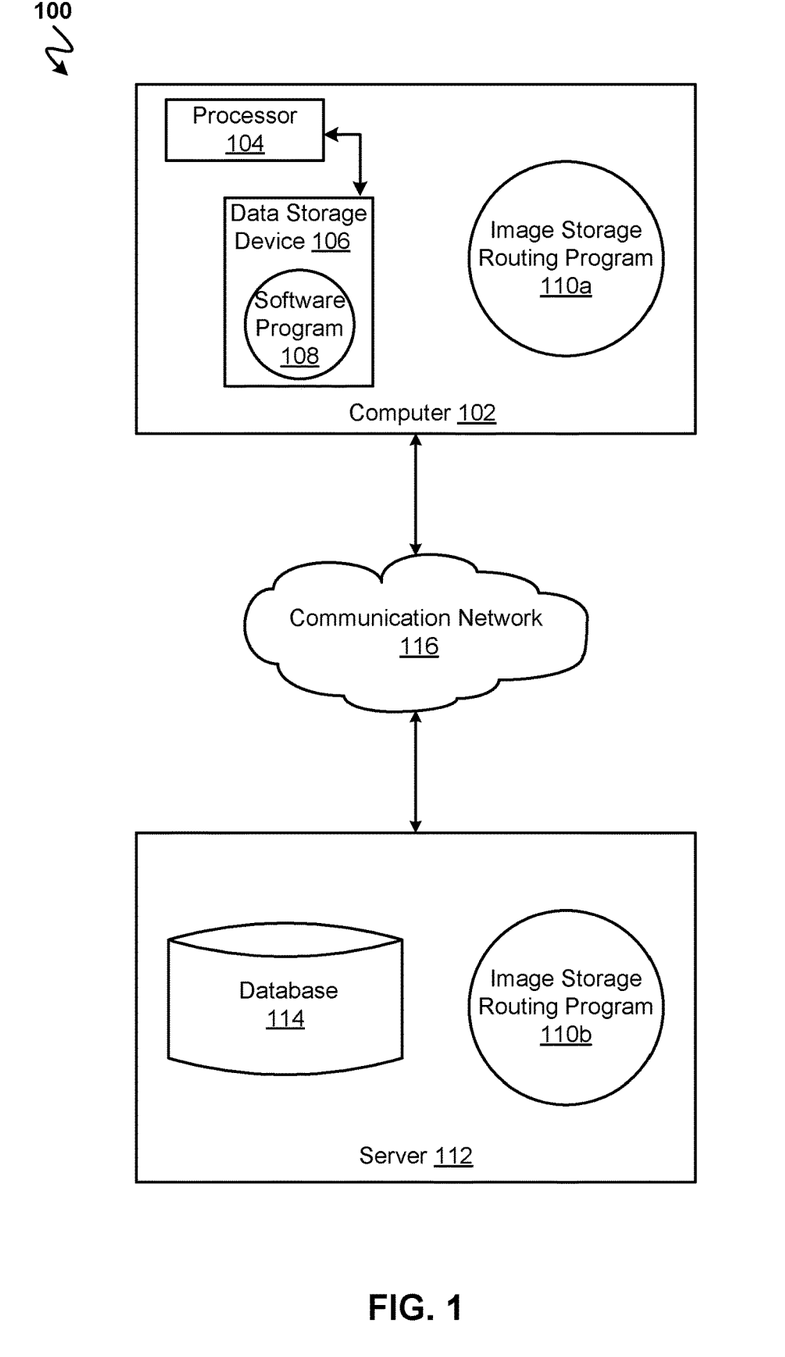
FIG. 1 illustrates a networked computer environment according to at least one embodiment.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and an image storage routing program 110a. The networked computer environment 100 may also include a server 112 that is enabled to run an image storage routing program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 3, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the image storage routing program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the image storage routing program 110a, 110b (respectively) to automatically route image files for storage from an imaging device to an external storage device. The image storage routing method is explained in more detail below with respect to FIG. 2.

Figure 2:
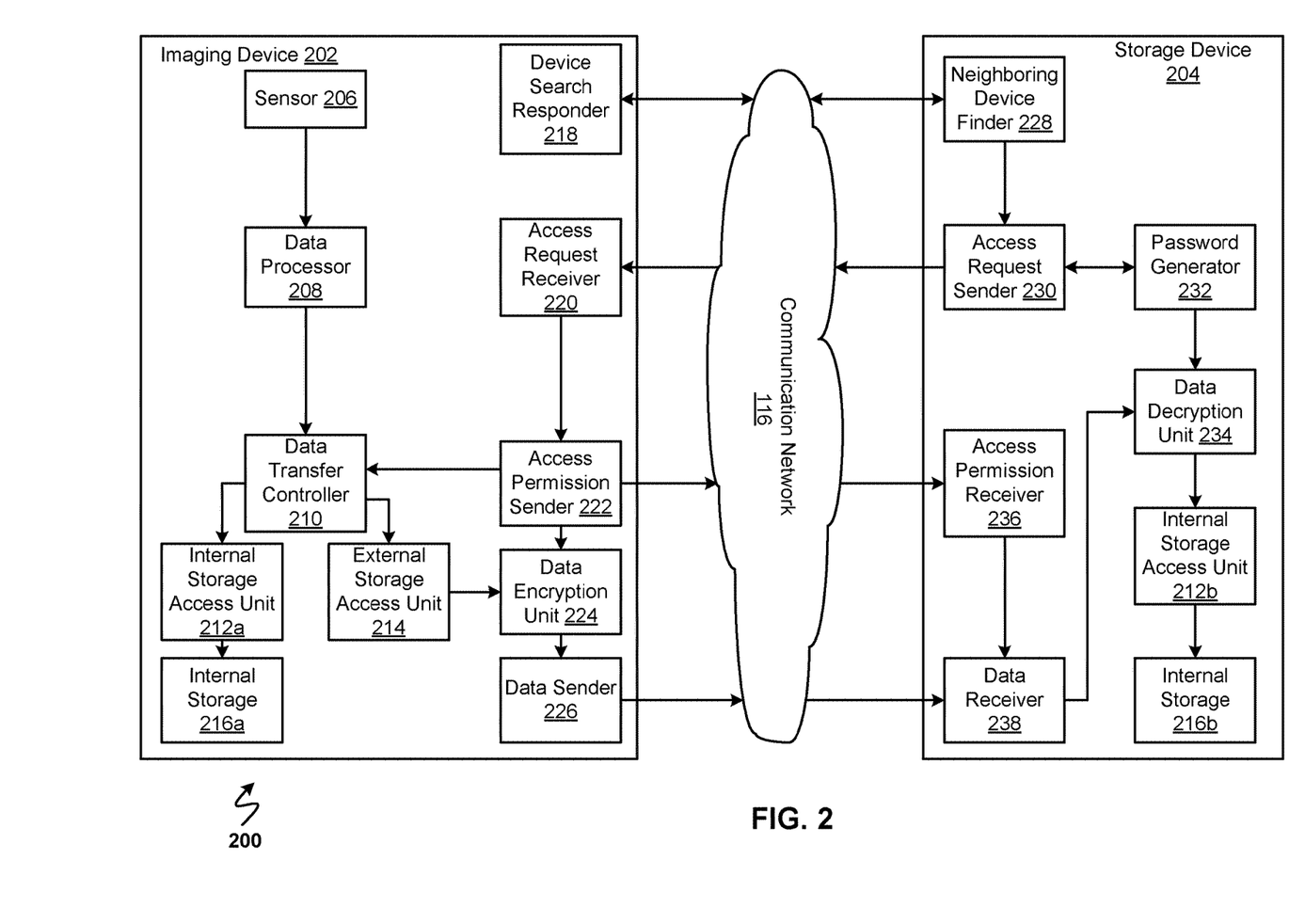
FIG. 2 is a system flow diagram illustrating an image file routing system according to at least one embodiment.

Referring now to FIG. 2, a system flow diagram illustrating an image file routing system 200 according to at least one embodiment is depicted. The image file routing system 200 may include an imaging device 202, such as a camera, and an external storage device 204, such as a smartphone or other mobile device, that communicate using a communication network 116.

The imaging device 202 may include a sensor 206, a data processor 208 (e.g., processor 104), a data transfer controller 210, an internal storage access unit 212a, an external storage access unit 214, internal storage 216a, a device search responder 218, an access request receiver 220, an access permission sender 222, a data encryption unit 224, and a data sender 226. The storage device 204 may include a neighboring device finder 228, an access request sender 230, a password generator 232, a data decryption unit 234, an access permission receiver 236, a data receiver 238, an internal storage access unit 212b, and internal storage 216b.

The neighboring device finder 228 within the storage device 204 may begin by searching for a neighboring imaging device 202 using a near-field communication network 116, such as Bluetooth® and NFC. Alternatively, infrared communication or an accelerometer sensor may be used for inter-device communication. When the neighboring device finder 228 detects the imaging device 202 using the communication network 116, the device search responder 218 in the imaging device 202 may respond by sending a digital certificate or public key certificate and imaging device 202 capability information to the neighboring device finder 228 in the storage device 204 over the communication network 116. The digital certificate may be issued from a third-party certification authority that certifies the ownership of a public key for each device (e.g., imaging device 202). Additionally, the digital certificate may certify the existence of a data transfer mechanism which exclusively selects a storage location, such as internal storage 216a or external storage (e.g., internal storage 216b which is external to the imaging device 202). The neighboring device finder 228 may receive the digital certificate containing a public key from the device search responder 218 and transfer the digital certificate to the access request sender 230.

Thereafter, the access request sender 230 running on the storage device 204 may request a onetime use password from the password generator 232. The password generator 232 may use known password generation algorithms to create a onetime use password. The password generator 232 may then send the onetime use password to the access request sender 230 and to the data decryption unit 234. The access request sender 230 may then encrypt the onetime use password using a public key obtained from the digital certificate received earlier. Additionally, imaging device 202 capabilities, such as preferred picture resolution, color depth, contrast, sharpness, image format, and the like may be appended to the encrypted onetime use password. Then, the encrypted onetime use password and any appended preferences may be sent with a request for access to the imaging device 202 over the communication network 116.

The access request receiver 220 may then receive the encrypted onetime use password with appended preferences and the request for access. The access request receiver 220 may identify the appended preferences and determine if the capabilities of the imaging device 202 can satisfy the preferences from the storage device 204. If the access request receiver 220 determines that the imaging device 202 can satisfy the received preferences, the access request receiver 220 may permit access and transfer the encrypted password and the preferences to the access permission sender 222. The access permission sender 222 may then send a permission acknowledgement to the storage device 204 over the communication network 116 to the access permission receiver 236. Furthermore, the access permission sender 222 may decrypt the onetime use password using the private key and send the decrypted onetime use password to the data encryption unit 224 for storage and later use. Finally, the access permission sender 222 may send a request to the data transfer controller 210 to switch data transfer mode to an exclusive external storage mode indicating that external storage via the storage device 204 may be used as opposed to using exclusively internal storage 216a when in an internal storage mode. Once the access permission receiver 236 receives permission from the imaging device 202, the access permission receiver 236 may send a request to the data receiver 238 to wait for incoming data from the imaging device 202.

The sensor 206 may be a sensing unit, such as a charge-coupled device (CCD) or complimentary metal-oxide semiconductor (CMOS) in a digital camera that captures images. The data processor 208 may be used to process image data generated by the sensor 206 to remove image noise or perform analog-to-digital conversions. After the image is processed by the data processor 208, the data transfer controller 210 may transfer the image to either the internal storage access unit 212a or the external storage access unit 214 based on input from the access permission sender 222 indicating that the imaging device is in external storage mode. If the imaging device 202 is in the internal storage mode, then the image may be transferred to the internal storage access unit 212a within the imaging device 202 for optional image data processing and then the image file may be stored in internal storage 216a. However, if the imaging device 202 is in the external storage mode after receiving a request from the access permission sender 222, then the data transfer controller 210 may send the image file to the external storage access unit 214 for optional image data processing to alter the image consistent with the received preferences before transferring the image file to the data encryption unit 224. The data encryption unit 224 may then encrypt the image file using the decrypted onetime use password before transferring the encrypted image file to the data sender 226. The data sender 226 then sends the encrypted image file using the communication network 116 from the imaging device 202 to the data receiver 238 within the storage device 204.

Once the data receiver 238 receives the encrypted image file data sent over the communication network 116 from the imaging device 202, the encrypted image file may be sent to the data decryption unit 234. The data decryption unit 234 uses the onetime use password received from the password generator 232 to decrypt the image file and then pass the decrypted image file to the internal storage access unit 212b. The internal storage access unit 212b may perform optional image file processing before transferring the image file for storage in internal storage 216b, such as a solid state storage drive.

It may be appreciated that FIG. 2 provides only an illustration of one embodiment and does not imply any limitations with regard to how different embodiments may be implemented. Many modifications to the depicted embodiment(s) may be made based on design and implementation requirements.

For example, the access request sender 230 in the storage device 204 and the access request receiver 220 in the imaging device 202 may execute additional communication via the communication network 116 to determine the trustworthiness of each other device before establishing a data transfer channel. First, the access request sender 230 may generate a random number and encrypt the onetime use password with the appended random number and preferences as described previously using the public key. The encrypted onetime use password and appended random number may then be sent along with a plain text copy of the random number to the access request receiver 220. Upon receipt of the encrypted onetime use password and random number, and the plain text random number, the access request receiver 220 may decrypt the onetime use password and random number and compare the decrypted random number to the plain text random number. If the decrypted random number and the plain text random number do not match, then the access request receiver 220 may reject the access request from the access request sender 230 as the storage device 204 may be considered untrustworthy. However, if the decrypted random number and the plain text random number do match, then the access request receiver 220 may encrypt the random number with the onetime use password and send the encrypted random number to the access request sender 230. The access request sender 230 may then decrypt the random number using the onetime use password. Thereafter, the access request sender 230 may compare the decrypted random number to the random number originally generated. If the decrypted random number matches the original random number, the access request sender 230 may continue to interact with the imaging device 202 as described above. However, if the decrypted random number does not match the original random number, the access request sender 230 may close the connection as the imaging device 202 may be considered untrustworthy.

According to at least one other embodiment, the storage device 204 may provide the user with options to set the image file preferences that may be sent later to the imaging device 202. For example, if the storage device 204 is a smartphone, a user interface generated by a phone application may display user-selectable preferences for image resolution, color depth, white balance, contrast, orientation (i.e., portrait or landscape), flash settings, and the like. The user may then select the user's image preferences from drop-down lists, sliders, option buttons, check boxes, and other UI features with fingertip interaction with the smartphone touchscreen. The user's preferences may be stored in a file, such as a text file, in the storage device's 204 internal storage 216b. Later, the access request sender 230 may retrieve the stored user preference file and send the user preferences to the imaging device 202 as described previously.

Figure 3:
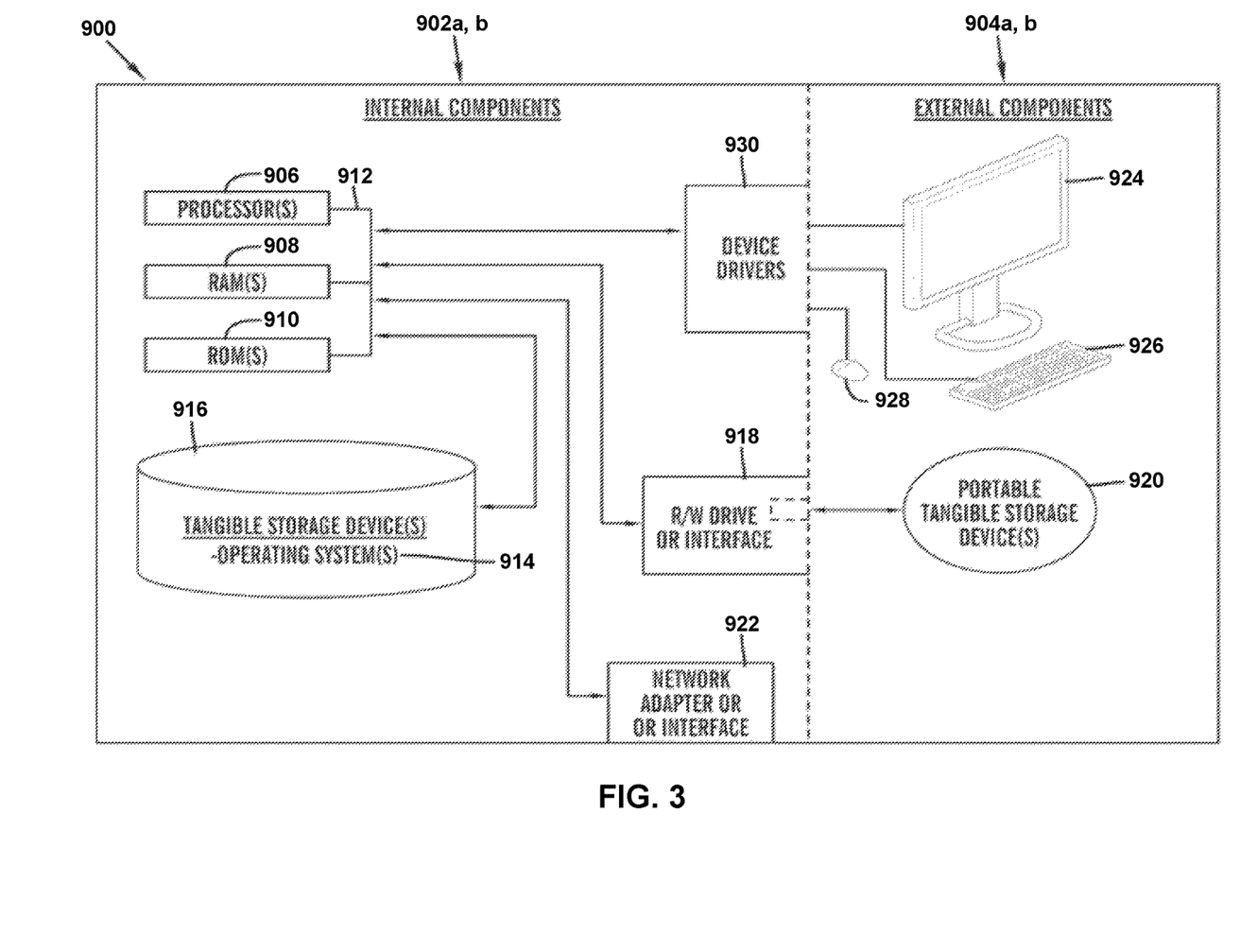
FIG. 3 is a block diagram of internal and external components of computers and servers depicted in FIG. 1 according to at least one embodiment.

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 3. Each of the sets of internal components 902 a, b includes one or more processors 906, one or more computer-readable RAMs 908, and one or more computer-readable ROMs 910 on one or more buses 912, and one or more operating systems 914 and one or more computer-readable tangible storage devices 916. The one or more operating systems 914, the software program 108, and the image storage routing program 110a in client computer 102, and the image storage routing program 110b in network server 112, may be stored on one or more computer-readable tangible storage devices 916 for execution by one or more processors 906 via one or more RAMs 908 (which typically include cache memory). In the embodiment illustrated in FIG. 3, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the image storage routing program 110a and 110b can be stored on one or more of the respective portable computer-readable tangible storage devices 920, read via the respective R/W drive or interface 918, and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the image storage routing program 110a in client computer 102 and the image storage routing program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the image storage routing program 110a in client computer 102 and the image storage routing program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926, and computer mouse 928. The device drivers 930, R/W drive or interface 918, and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
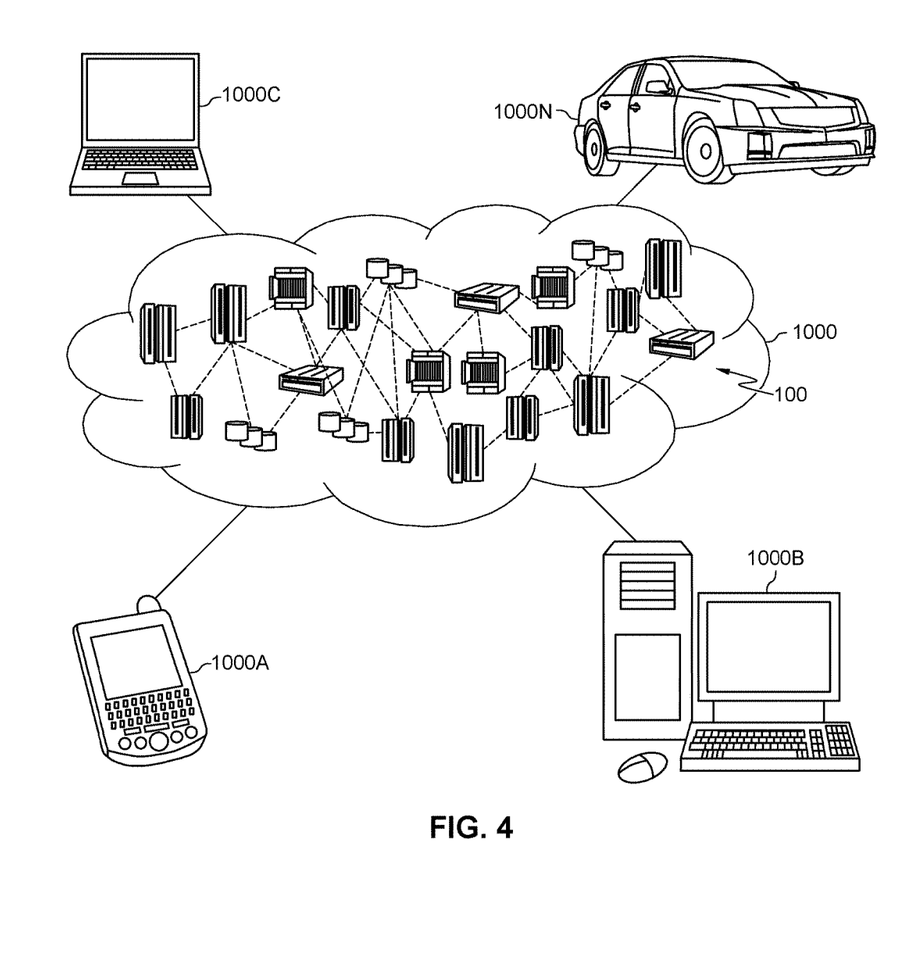
FIG. 4 is a block diagram of an illustrative cloud computing environment including the computer system depicted in FIG. 1, in accordance with an embodiment of the present disclosure.

Referring now to FIG. 4, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 100 and cloud computing environment 1000 can communicate with any type of computerized device over any type of network and/or network addressable connection (e.g., using a web browser).

Figure 5:
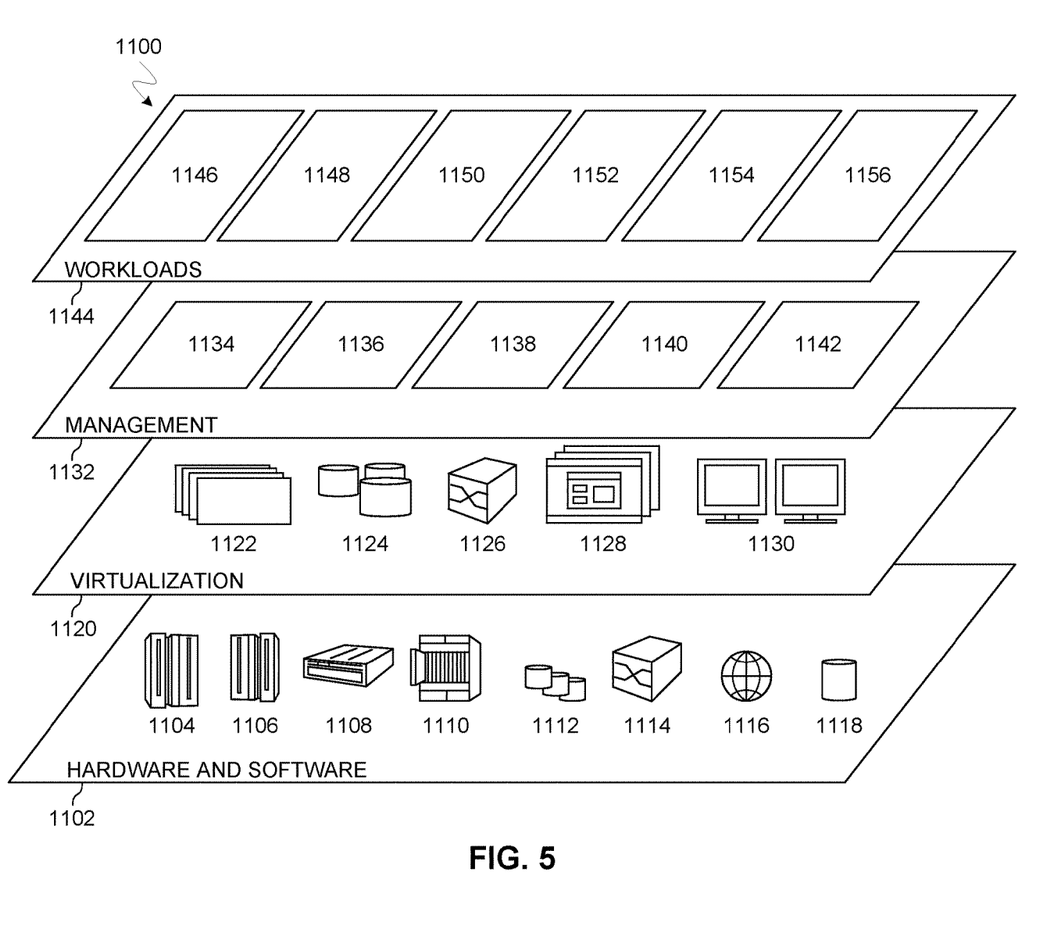
FIG. 5 is a block diagram of functional layers of the illustrative cloud computing environment of FIG. 4, in accordance with an embodiment of the present disclosure.

Referring now to FIG. 5, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and image storage routing 1156. An image storage routing program 110a, 110b provides a way to automatically send image files from an imaging device to a personal storage device located in close proximity to each other.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for routing an image file from an imaging device to a storage device via a near-field communication network, the method comprising:
    receiving a neighboring device search signal from the storage device;
    sending a search signal response to the storage device;
    receiving an encrypted password from the storage device;
    determining a onetime password based on decrypting the received encrypted password;
    setting the imaging device to an exclusive external storage mode, wherein the exclusive external storage mode prevents the imaging device from storing the generated image file in an imaging device internal storage;
    generating an image file using a sensor associated with the imaging device;
    encrypting the image file using the decrypted onetime password based on the setting the imaging device to the exclusive external storage mode; and
    sending the encrypted image file to the storage device for storage.

2. The method of claim 1, further comprising:
    receiving, by the storage device, the sent encrypted image file;
    decrypting, by the storage device, the received encrypted image file using the onetime password; and
    storing the decrypted image file in internal storage within the storage device.

3. The method of claim 1, further comprising:
    in response to receiving the neighboring device search signal from the storage device, requesting a digital certificate having a public key from a certificate authority;
    receiving the requested digital certificate;
    sending the received digital certificate to the storage device; and
    wherein the received encrypted password is decrypted using the public key.

4. The method of claim 1, wherein the received encrypted password includes a plurality of image preferences.

5. The method of claim 4, further comprising:
    granting access to the storage device based on comparing the plurality of image preferences to a plurality of imaging device capabilities.

6. The method of claim 1, wherein the image file is routed from the imaging device to the storage device via the near-field communication network when the imaging device and the storage device are within a distance threshold.

7. A computer system for routing an image file from an imaging device to a storage device via a near-field communication network, comprising:
    one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
    receiving a neighboring device search signal from the storage device;
    sending a search signal response to the storage device;
    receiving an encrypted password from the storage device;
    determining a onetime password based on decrypting the received encrypted password;
    setting the imaging device to an exclusive external storage mode, wherein the exclusive external storage mode prevents the imaging device from storing the generated image file in an imaging device internal storage;
    generating an image file using a sensor associated with the imaging device;
    encrypting the image file using the decrypted onetime password based on the setting the imaging device to the exclusive external storage mode; and
    sending the encrypted image file to the storage device for storage.

8. The computer system of claim 7, further comprising:
    receiving, by the storage device, the sent encrypted image file;
    decrypting, by the storage device, the received encrypted image file using the onetime password; and
    storing the decrypted image file in internal storage within the storage device.

9. The computer system of claim 7, further comprising:
    in response to receiving the neighboring device search signal from the storage device, requesting a digital certificate having a public key from a certificate authority;
    receiving the requested digital certificate;
    sending the received digital certificate to the storage device; and
    wherein the received encrypted password is decrypted using the public key.

10. The computer system of claim 7, wherein the received encrypted password includes a plurality of image preferences.

11. The computer system of claim 10, further comprising:
    granting access to the storage device based on comparing the plurality of image preferences to a plurality of imaging device capabilities.

12. The computer system of claim 7, wherein the image file is routed from the imaging device to the storage device via the near-field communication network when the imaging device and the storage device are within a distance threshold.

13. A computer program product for routing an image file from an imaging device to a storage device via a near-field communication network, comprising:
    one or more computer-readable storage medium and program instructions stored on at least one of the one or more tangible storage medium, the program instructions executable by a processor, the program instructions comprising:
    program instructions to receive a neighboring device search signal from the storage device;
    program instructions to send a search signal response to the storage device;
    program instructions to receive an encrypted password from the storage device;
    program instructions to determine a onetime password based on decrypting the received encrypted password;
    program instructions to set the imaging device to an exclusive external storage mode wherein the exclusive external storage mode prevents the imaging device from storing the generated image file in an imaging device internal storage;
    program instructions to generate an image file using a sensor associated with the imaging device;

program instructions to encrypt the image file using the decrypted onetime password based on the setting the imaging device to the exclusive external storage mode; and program instructions to send the encrypted image file to the storage device for storage.

14. The computer program product of claim 13, further comprising:

program instructions to receive, by the storage device, the sent encrypted image file;

program instructions to decrypt, by the storage device, the received encrypted image file using the onetime password; and program instructions to store the decrypted image file in internal storage within the storage device.

15. The computer program product of claim 13, further comprising:

program instructions to request a digital certificate having a public key from a certificate authority, in response to receiving the neighboring device search signal from the storage device;

program instructions to receive the requested digital certificate;

program instructions to send the received digital certificate to the storage device; and wherein the received encrypted password is decrypted using the public key.

16. The computer program product of claim 13, wherein the received encrypted password includes a plurality of image preferences.

17. The computer program product of claim 16, further comprising:

program instructions to grant access to the storage device based on comparing the plurality of image preferences to a plurality of imaging device capabilities.

* * * * *